United States Patent
Eitan et al.

(10) Patent No.: US 9,948,490 B2
(45) Date of Patent: Apr. 17, 2018

(54) PREAMBLE FOR NON-LINEARITY ESTIMATION

(71) Applicant: QUALCOMM Incorporated, San Diego, CA (US)

(72) Inventors: Alecsander Petru Eitan, Haifa (IL); Amichai Sanderovich, Atlit (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/340,358

(22) Filed: Nov. 1, 2016

(65) Prior Publication Data
US 2017/0134210 A1   May 11, 2017

Related U.S. Application Data

(60) Provisional application No. 62/252,409, filed on Nov. 6, 2015.

(51) Int. Cl.
| | |
|---|---|
| *H04L 25/49* | (2006.01) |
| *H04L 27/36* | (2006.01) |
| *H04B 7/04* | (2017.01) |
| *H04B 1/04* | (2006.01) |
| *H04L 29/06* | (2006.01) |

(52) U.S. Cl.
CPC ......... *H04L 27/367* (2013.01); *H04B 1/0475* (2013.01); *H04B 7/0465* (2013.01); *H04B 2001/0425* (2013.01); *H04L 69/22* (2013.01)

(58) Field of Classification Search
CPC .............. H04L 27/367; H04L 69/22; H04B 2001/0425; H04B 2001/465
USPC ............. 375/297, 268, 259, 329; 370/389
See application file for complete search history.

(56) References Cited

U.S. PATENT DOCUMENTS

| | | | |
|---|---|---|---|
| 2007/0153884 A1 | 7/2007 | Balasubramanian et al. | |
| 2007/0275669 A1 | 11/2007 | Rietman et al. | |
| 2011/0051705 A1 | 3/2011 | Jones, IV et al. | |
| 2013/0016649 A1* | 1/2013 | Damnjanovic | H04W 88/04 370/315 |
| 2013/0028253 A1* | 1/2013 | Chapman | H04L 12/4633 370/389 |
| 2014/0154998 A1 | 6/2014 | Park et al. | |

OTHER PUBLICATIONS

International Search Report and Written Opinion—PCT/US2016/060049—ISA/EPO—May 2, 2017.

* cited by examiner

*Primary Examiner* — Khai Tran
(74) *Attorney, Agent, or Firm* — Patterson & Sheridan, LLP

(57) ABSTRACT

Certain aspects of the present disclosure relate to methods and apparatus for wireless communication. More particularly, aspects of the present disclosure generally relate to techniques for wireless communications by an apparatus comprising a processing system configured to a processing system configured to generate a frame having at least a first header that is phase modulated and to modulate an amplitude of the first header prior to the first header being amplified by a power amplifier, and a first interface configured to output the frame for transmission.

21 Claims, 16 Drawing Sheets

US 9,948,490 B2

PREAMBLE FOR NON-LINEARITY ESTIMATION

CLAIM OF PRIORITY UNDER 35 U.S.C. § 119

The present Application for Patent claims benefit of U.S. Provisional Patent Application Ser. No. 62/252,409, filed Nov. 6, 2015, which is assigned to the assignee hereof and hereby expressly incorporated by reference herein in their entirety.

TECHNICAL FIELD

Aspects of the present disclosure relate generally to wireless communications systems and, more particularly, to techniques for generating and processing portions of a frame for aiding in estimating non-linearities of a transmit power amplifier.

BACKGROUND

The 60 GHz band is an unlicensed band which features a large amount of bandwidth and a large worldwide overlap. The large bandwidth means that a very high volume of information can be transmitted wirelessly. As a result, multiple applications, each requiring transmission of large amounts of data, can be developed to allow wireless communication around the 60 GHz band. Examples for such applications include, but are not limited to, game controllers, mobile interactive devices, wireless high definition TV (HDTV), wireless docking stations, wireless Gigabit Ethernet, and many others.

In order to facilitate such applications there is a need to develop integrated circuits (ICs) such as amplifiers, mixers, radio frequency (RF) analog circuits, and active antennas that operate in the 60 GHz frequency range. An RF system typically comprises active and passive modules. The active modules (e.g., a power amplifier or other amplifiers) require control and power signals for their operation, which are not required by passive modules (e.g., filters). The various modules are fabricated and packaged as radio frequency integrated circuits (RFICs) that can be assembled on a printed circuit board (PCB). The size of the RFIC package may range from several to a few hundred square millimeters.

In the consumer electronics market, the design of electronic devices, and thus the design of RF modules integrated therein, should meet the constraints of minimum cost, size, power consumption, and weight. The design of the RF modules should also take into consideration the current assembled configuration of electronic devices, and particularly handheld devices, such as laptop and tablet computers, in order to enable efficient transmission and reception of millimeter wave signals. Furthermore, the design of the RF module should account for minimal power loss of receive and transmit RF signals and for maximum radio coverage.

Throughput in the 60 GHz band may be extended by various techniques, including, for example, by higher bandwidths, MIMO, higher constellations of signals, and high power output. One of the challenges of higher power outputs is achieving high power amplifier (PA) linearity while retaining a high output power and efficiency in a cost effective manner.

SUMMARY

Certain aspects of the present disclosure relate to methods and apparatus for wireless communication. More particularly, aspects of the present disclosure generally relate to techniques for wireless communications by an apparatus comprising a processing system configured to generate a frame having at least a first header that is phase modulated, modulate an amplitude of the first header prior to the first header being amplified by a power amplifier, and an interface configured to output the frame for transmission.

Certain aspects of the present disclosure relate to methods and apparatus for wireless communication. More particularly, aspects of the present disclosure generally relate to techniques for wireless communications by an apparatus comprising an interface configured to obtain a frame having at least a first header, and a processing system configured to estimate, based on information regarding amplitude modulation of the first header, a transfer function associated with transmission of the first header and to process a remaining portion of the frame based on the estimated transfer function.

Certain aspects of the present disclosure also provide various other apparatuses, methods, and computer readable media capable of performing (or causing an apparatus to perform) the operations described herein.

DETAILED DESCRIPTION

Figure 1:
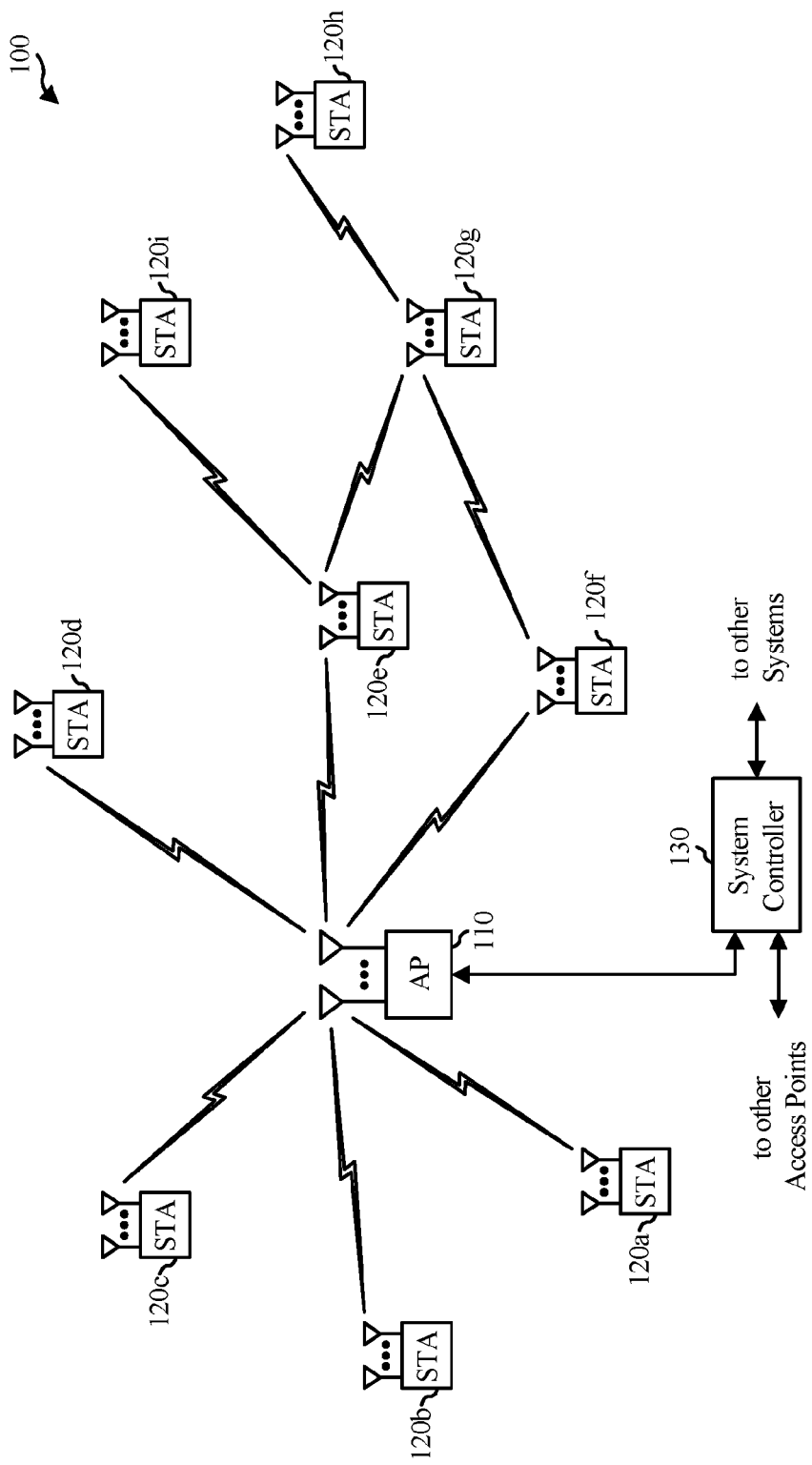
FIG. 1 illustrates a diagram of an example wireless communications network, in accordance with certain aspects of the present disclosure.

Certain aspects of the present disclosure provide techniques for generating and transmitting portions of a frame for aiding in estimating non-linearities of a transmit power amplifier. For example, a phase modulated header may be amplitude modulated based on a particular pattern. A receiver may compare the received signal for the header with an expected signal and, based on this comparison, estimate an amount of non-linearity introduced by a power amplifier used in transmitting the signal.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple STAs. A TDMA system may allow multiple STAs to share the same frequency channel by dividing the transmission signal into different time slots, each time slot being assigned to different STA. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an STA.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with APs and STAs in which aspects of the present disclosure may be practiced. The MIMO system 100 may be a multiuser MIMO system (MU-MIMO). Although not illustrated in FIG. 1, another example wireless communication can be a single-input single-output (SISO) in which aspects of the present disclosure can be practiced.

For simplicity, only one access point 110 is shown in FIG. 1. An access point is generally a fixed station that communicates with the STAs and may also be referred to as a base station or some other terminology. A STA may be fixed or mobile and may also be referred to as a mobile station, a wireless device, or some other terminology. Access point 110 may communicate with one or more STAs 120 at any given moment on the downlink and uplink. The downlink (i.e., forward link) is the communication link from the access point to the STAs, and the uplink (i.e., reverse link) is the communication link from the STAs to the access point. A STA may also communicate peer-to-peer with another STA. A system controller 130 couples to and provides coordination and control for the access points.

While portions of the following disclosure will describe STAs 120 capable of communicating via Spatial Division Multiple Access (SDMA), for certain aspects, the STAs 120 may also include some STAs that do not support SDMA.

Thus, for such aspects, an AP 110 may be configured to communicate with both SDMA and non-SDMA STAs. This approach may conveniently allow multiple versions of STAs ("legacy" stations) to remain deployed in an enterprise, extending their useful lifetime, while allowing newer SDMA STAs to be introduced as deemed appropriate.

In the example system 100, the access point 110 and STAs 120 can employ multiple transmit and multiple receive antennas for data transmission on the downlink and uplink. In a SISO system, the AP 110 and STAs 120 can employ only a single antenna for transmission and reception. Although not shown, other example wireless communications systems in which the aspects of the present disclosure can be deployed include a SISO system, MU-MIMO system, single carrier MIMO system, or single carrier MU-MIMO system. For downlink MIMO transmissions, $N_{ap}$ antennas of the access point 110 represent the multiple-input (MI) portion of MIMO, while a set of K STAs represent the multiple-output (MO) portion of MIMO. Conversely, for uplink MIMO transmissions, the set of K STAs represent the MI portion, while the $N_{ap}$ antennas of the access point 110 represent the MO portion. For pure SDMA, it is desired to have $N_{ap} \geq K \geq 1$ if the data symbol streams for the K STAs are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected STA transmits user-specific data to and/or receives user-specific data from the access point. In general, each selected STA may be equipped with one or multiple antennas (i.e., $N_{ut} \geq 1$). The K selected STAs can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each STA may be equipped with a single antenna (e.g., in order to keep costs down) or multiple antennas (e.g., where the additional cost can be supported). The system 100 may also be a TDMA system if the STAs 120 share the same frequency channel by dividing transmission/reception into different time slots, each time slot being assigned to different STA 120.

Figure 2:
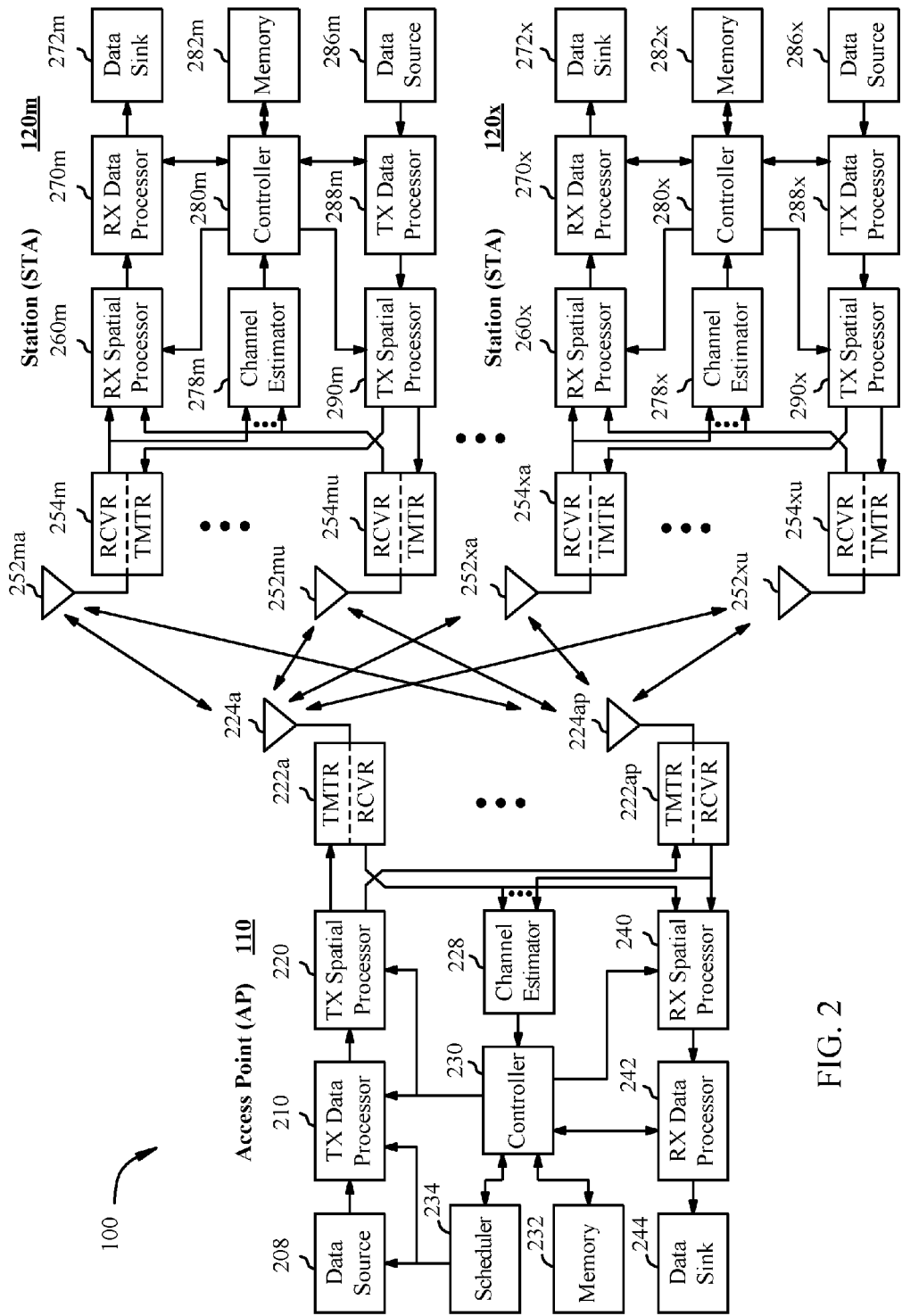
FIG. 2 illustrates a block diagram of an example access point and stations (STAs), in accordance with certain aspects of the present disclosure.

FIG. 2 illustrates a block diagram of access point 110 and two STAs 120m and 120x in MIMO system 100 in which aspects of the present disclosure may be practiced. As discussed above, the rotation determination techniques discussed herein may be practiced by an access point 110 or STA 120.

The access point 110 is equipped with $N_t$ antennas 224a through 224t. STA 120m is equipped with $N_{ut,m}$ antennas 252ma through 252mu, and STA 120x is equipped with $N_{ut,x}$ antennas 252xa through 252xu. The access point 110 is a transmitting entity for the downlink and a receiving entity for the uplink. Each STA 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup STAs are selected for simultaneous transmission on the uplink, Ndn STAs are selected for simultaneous transmission on the downlink, Nup may or may not be equal to Ndn, and Nup and Ndn may be static values or can change for each scheduling interval. The beam-steering or some other spatial processing technique may be used at the access point and STA.

On the uplink, at each STA 120 selected for uplink transmission, a transmit (TX) data processor 288 receives traffic data from a data source 286 and control data from a controller 280. TX data processor 288 processes (e.g., encodes, interleaves, and modulates) the traffic data for the STA based on the coding and modulation schemes associated with the rate selected for the STA and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup STAs may be scheduled for simultaneous transmission on the uplink. Each of these STAs performs spatial processing on its data symbol stream and transmits its set of transmit symbol streams on the uplink to the access point.

At access point 110, $N_{ap}$ antennas 224a through 224ap receive the uplink signals from all Nup STAs transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each STA may be provided to a data sink 244 for storage and/or a controller 230 for further processing.

On the downlink, at access point 110, a TX data processor 210 receives traffic data from a data source 208 for Ndn STAs scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA based on the rate selected for that STA. TX data processor 210 provides Ndn downlink data symbol streams for the Ndn STAs. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the STAs.

At each STA 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA. The receiver spatial processing is performed in accordance with the CCMI, MMSE or some other technique. An RX data processor 270 processes (e.g., demodulates, deinterleaves and decodes) the recovered downlink data symbol stream to obtain decoded data for the STA.

At each STA 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each STA typically derives the spatial filter matrix for the STA based on the downlink channel response matrix Hdn,m for that STA. Controller 230 derives the spatial filter matrix for the access point based on the effective uplink channel response matrix Hup,eff. Controller 280 for each STA may send feedback information (e.g., the downlink and/or uplink eigenvectors, eigenvalues, SNR estimates, and so on) to the access point. Controllers 230 and 280 also control the operation of various processing units at access point 110 and STA 120, respectively.

According to certain aspects of the present disclosure, the various processors shown in FIG. 2 may direct the operation at an AP 110 and/or STA 120, respectively, to perform various techniques described herein, to determine relative rotation based on training signals and/or other processes for the techniques described herein.

Figure 3:
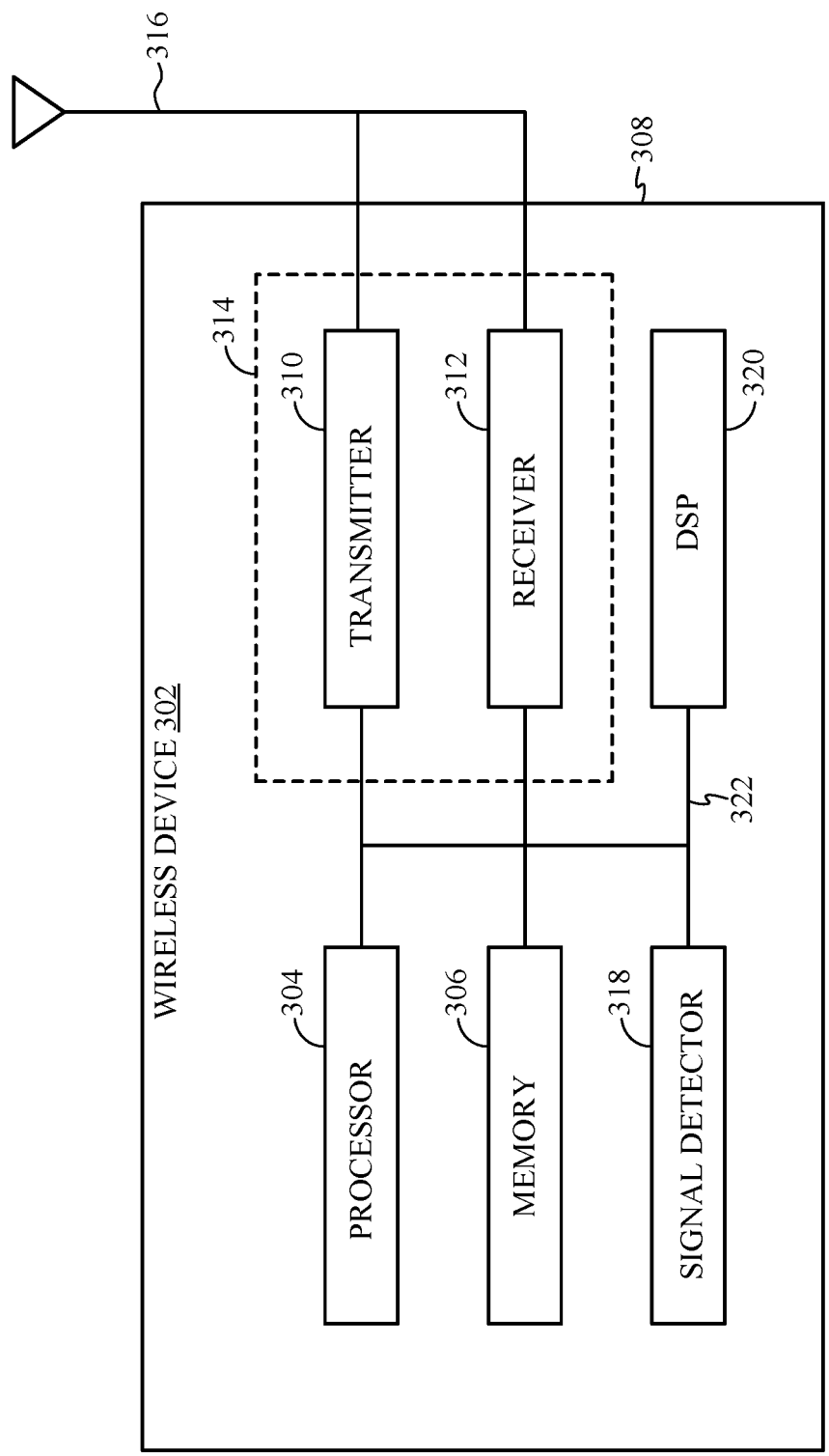
FIG. 3 illustrates a block diagram of an example wireless device, in accordance with certain aspects of the present disclosure.

FIG. 3 illustrates various components that may be utilized in a wireless device 302 in which aspects of the present disclosure may be practiced and that may be employed within the MIMO system 100. The wireless device 302 is an example of a device that may be configured to implement the various methods described herein. The wireless device 302 may be an access point 110 or a STA 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein. Processor 304 may, for example, perform or direct operations 600 in FIG. 6 to determine relative rotation and/or other processes for the techniques described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers. The transceiver can use a single antenna (as shown) for both transmitting and receiving or can use different antennas (not shown) for transmitting and receiving.

The wireless node 302 may use multiple transmitters, multiple receivers, and/or multiple transceivers in communicating with a WWAN and one or more WLANs. Additionally or alternatively, the wireless node 302 may communicate with a WWAN via a single transceiver 314 and retune the transceiver 314 (tune away from the WWAN) to communicate with one or more WLANs.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
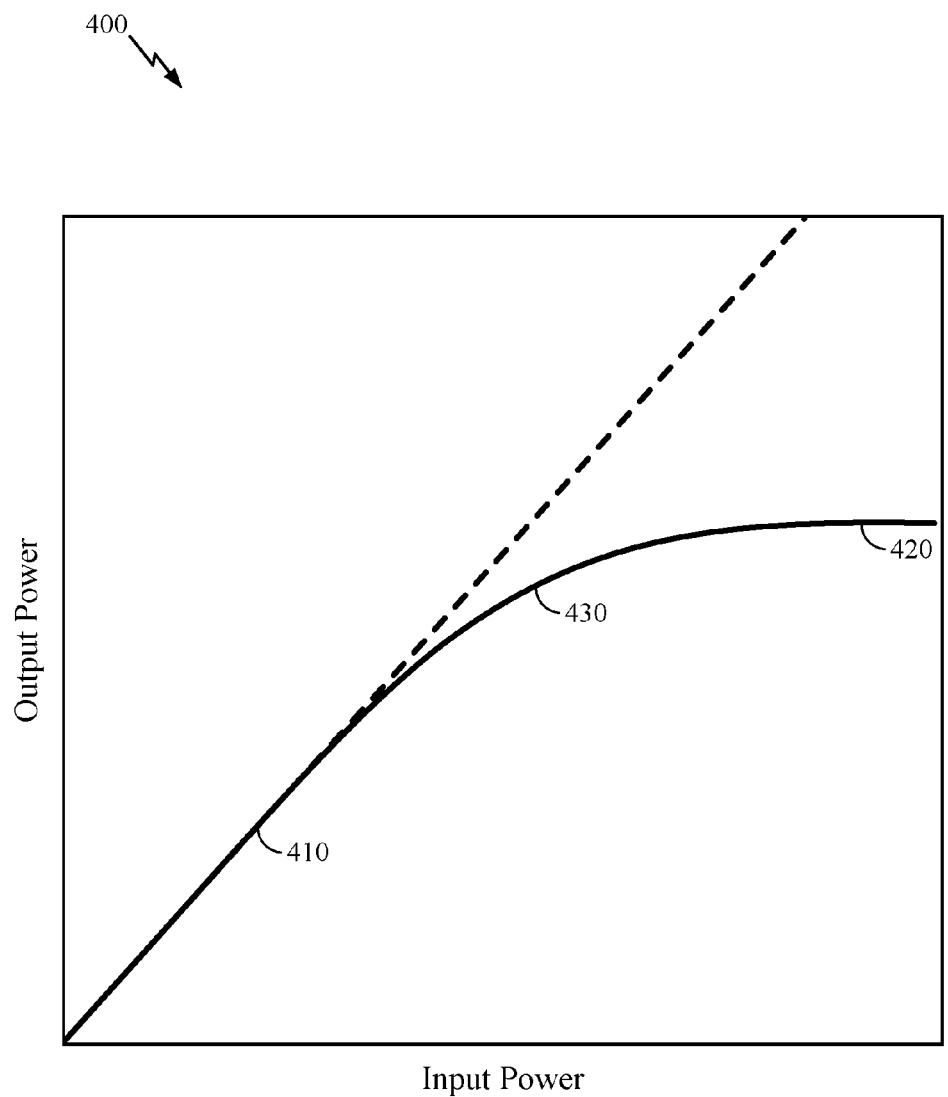
FIG. 4 is a diagram illustrating output power of a power amplifier, in accordance with certain aspects of the present disclosure.

FIG. 4 is a diagram 400 illustrating non-linearities in output of a transmit power amplifier that may be estimated using techniques described herein. The output power of a power amplifier (PA) may be plotted against the input power for a given frequency, where the slope of the curve represents amplifier gain for a particular power level. For region 410, there may be a linear relationship between the output power and the input power and gain may be constant. As input power increases, at some point, the input and output power levels begin losing their linear relationship and gain begins to decrease in region 430 as the PA goes into compression. Where no further output increases occur for input increases, as in region 420, the PA reaches saturation.

High output power levels are generally desired as higher output power levels allow for greater range and higher received signal to noise (SNR). To achieve high output power levels, a PA may be operated at or near saturation. Such operations may result in increased amount of distortion in the output of the PA and lowering the Tx error vector magnitude (EVM) and limiting signal constellations.

Figure 5:
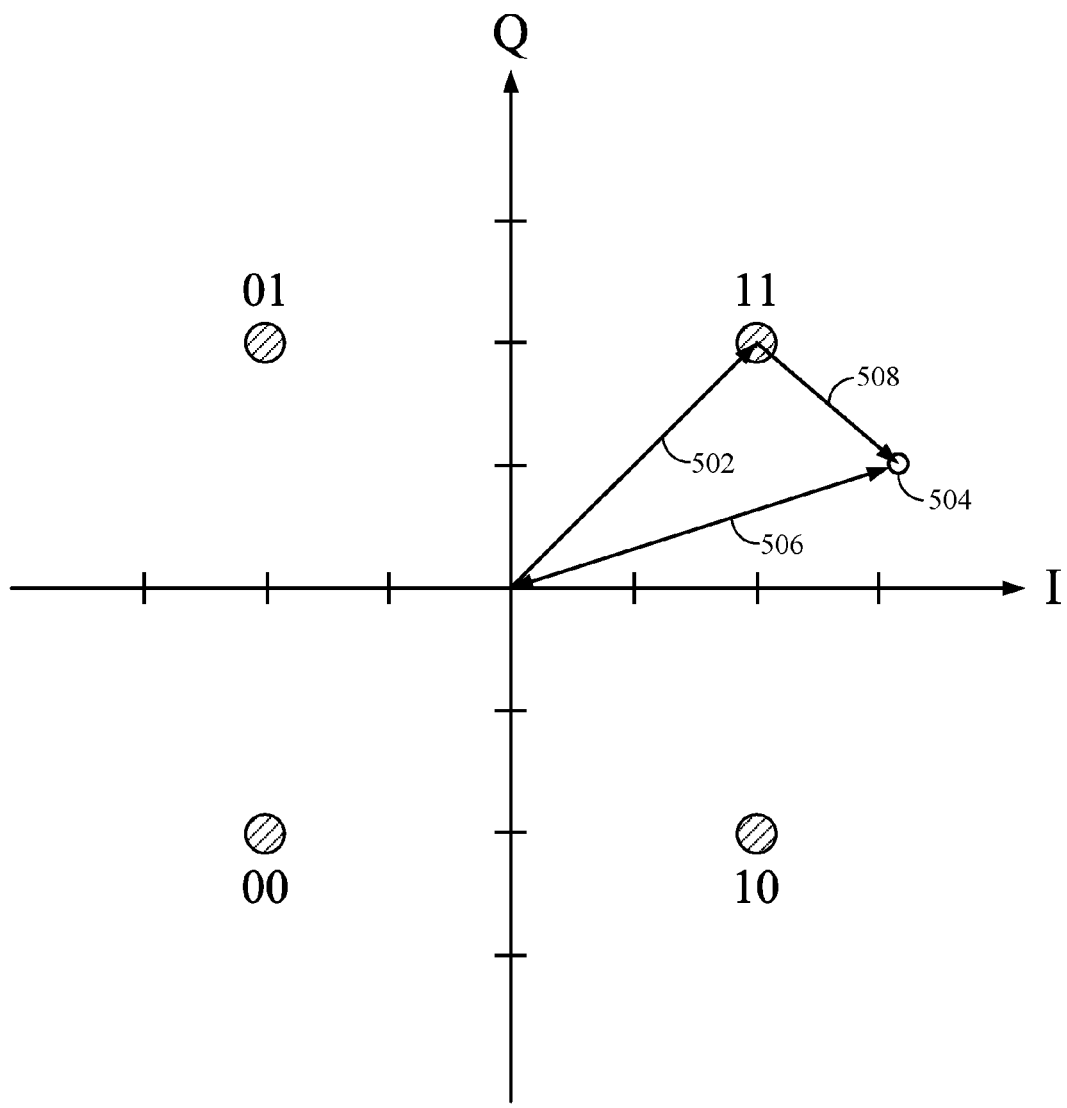
FIG. 5 is a diagram illustrating an error vector magnitude, in accordance with certain aspects of the present disclosure.

FIG. 5 illustrates how distortion or interference in a non-ideal signal may be visualized as a signal constellation. In this example constellation, four points, 00, 01, 10, and 11 each encode two bits per symbol. An ideal signal in the absence of noise, interference, distortion, etc., encoding the bits 11 would be received, for example, at point 11 with signal vector 502. A non-ideal signal may actually be received at point 504 with actual signal vector 506. The difference between the ideal signal vector and the actual signal vector is the error vector 508. The magnitude of error vector 508 is the EVM. The EVM is a measure of signal quality and may indicate how accurately symbols are received within a signal constellation. Generally, lower EVM results in constellation points closer to the ideal point. Higher EVM, for example due to distortion, results in more scattered points, which limit the signal constellations as more scattered constellation points may make it more difficult to distinguish constellation points which are more closely spaced.

High levels of linearity and associated lower levels of distortion at high output power may be achieved through careful calibration, pre-distortion and adaptive pre-distortion, or high backoff levels. However, these techniques may incur higher costs due to factory calibration requirements, additional or more costly hardware and power, or reduced power levels.

Example Preamble for Non-Linearity Estimation

As noted above, aspects of the present disclosure provide techniques that may facilitate non-linearity estimation based on an amplitude modulation of a phase modulated header. The techniques may be applied to any type of wireless device utilizing orthogonal frequency division multiplexing (OFDM) and single carrier (SC) modulation, such as 802.11ad and 802.11ay devices.

Figure 6:
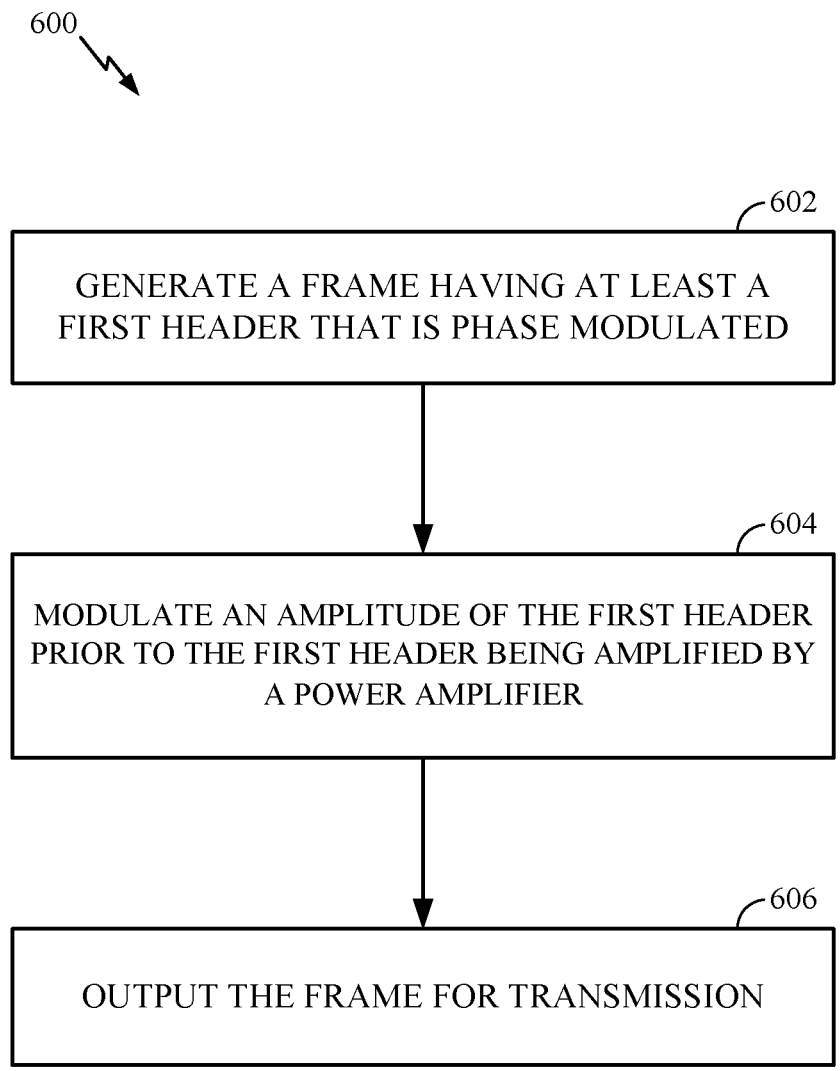
FIG. 6 illustrates a method for wireless communications, according to certain aspects of the present disclosure.

FIG. 6 illustrates example operations 600 for wireless communications, according to certain aspects of the present disclosure. Operations 600 begin, at 602, by generating a frame having at least a first header that is phase modulated. At 604, modulating an amplitude of the first header prior to the first header being amplified by a power amplifier. At 606, the frame is output for transmission.

Figure 7:
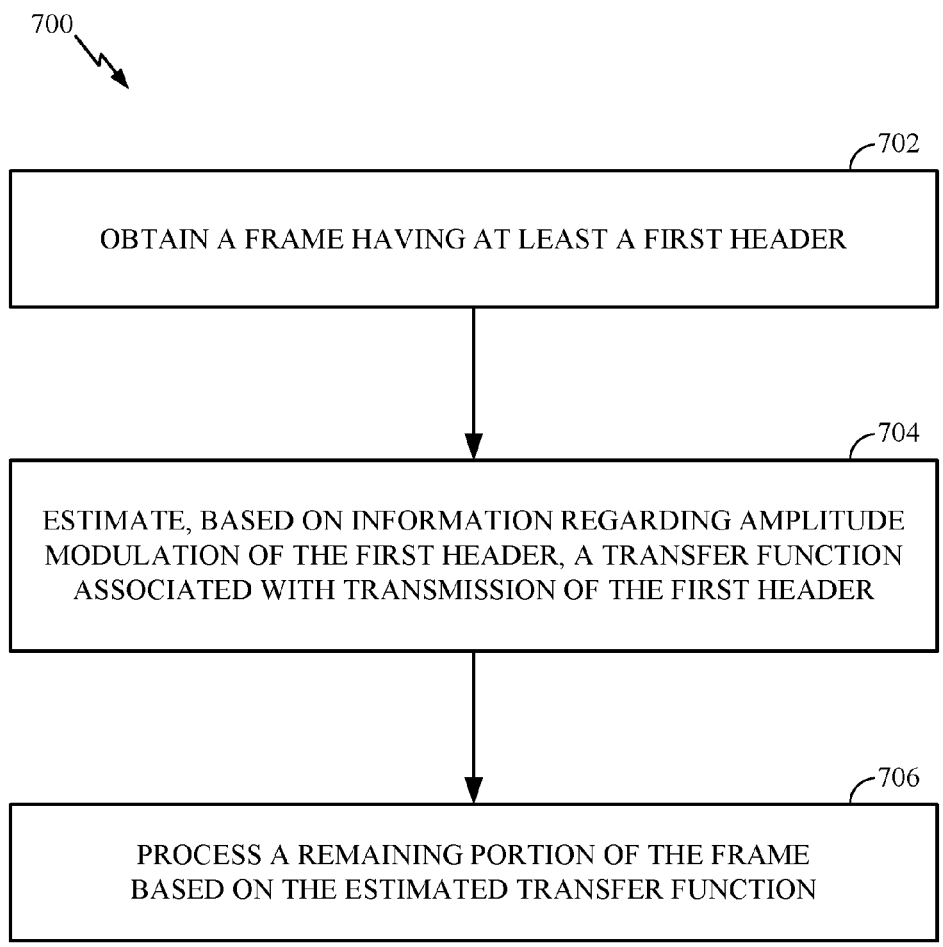
FIG. 7 illustrates a method for wireless communications, according to certain aspects of the present disclosure.

FIG. 7 illustrates example operations 700 for wireless communications, according to certain aspects of the present disclosure. The operations may be considered complementary operations to operations 600 shown in FIG. 7. In other words, operations 700 may be performed to process a frame generated according to operations 600 described above.

As shown, operations 700 begin, at 702, by obtaining a frame having at least a first header. At 704, estimating, based on information regarding amplitude modulation of the first header, a transfer function associated with transmission of the first header. At 706, processing a remaining portion of the frame based on the estimated transfer function.

Figure 8A:
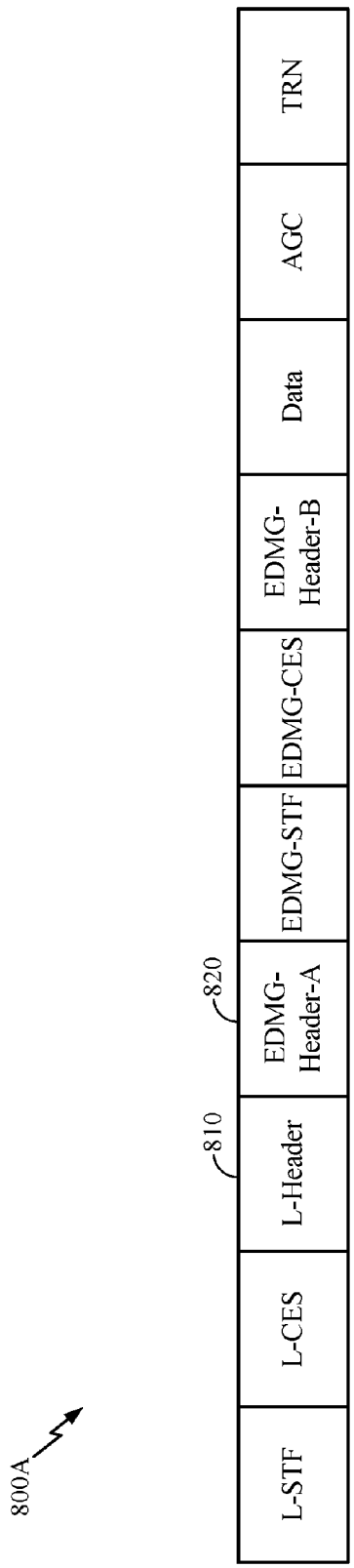
FIG. 8A illustrates an example an example frame that may be generated and transmitted in accordance with aspects of the present disclosure.

FIG. 8A illustrates an example an example frame 800A that may be generated and transmitted in accordance with aspects of the present disclosure. The example frame 800A may comprise an enhanced directional multi-gigabit (EDMG) physical layer convergence protocol (PLCP) protocol data unit (PPDU). As shown, an EDMG PPDU may include various headers including a legacy header (L-Header) 810 and an EDMG header (EDMG-Header-A) 820.

Figure 8B:
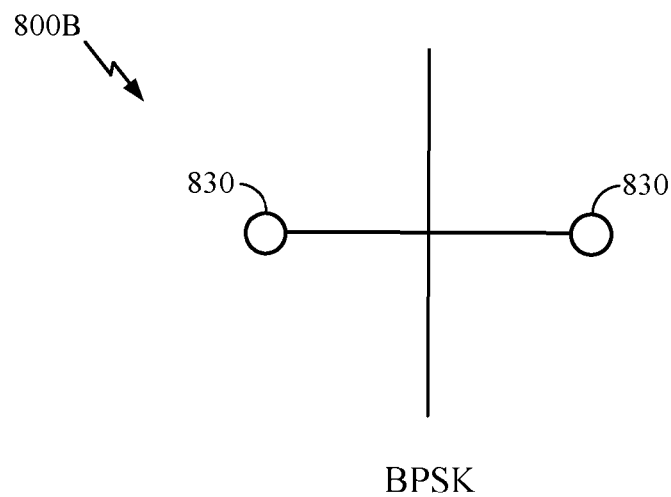
FIGS. 8B and 8C are example constellation diagrams for an example frame that may be generated and transmitted in accordance with aspects of the present disclosure.

Both the L-Header 810 and EDMG header 820 may incorporate robust modulation schemes to allow receivers on the coverage edge to correctly receive and demodulate the information contained in the headers. The L-Header 810 may, for example, be a header defined previously in a separate standard, such as 802.11ad. In some cases, the L-Header 810 may be binary phase shift keying (BPSK) modulated and include rotation support. Phase shift keying (PSK) modulation for a reference signal (e.g., carrier wave) encodes data by modulating the phase of the reference signal. BPSK modulation is a form of PSK and may incorporate two phases 830, separated by 180 degrees, as illustrated in constellation diagram 800B of FIG. 8B, such that the exact positioning of the constellation points does not particularly matter. The information encoded by such a signal is based on the phase and the signal has a low peak to average power ratio (PAPR).

Figure 8C:
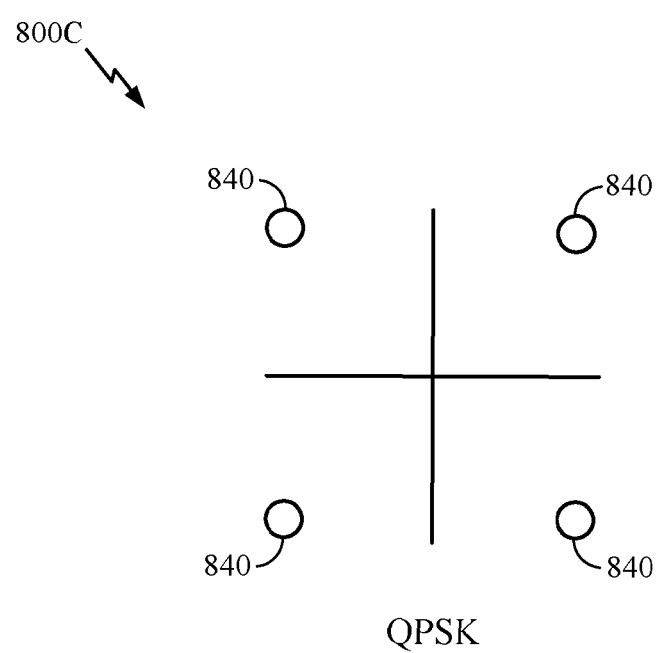

The EDMG header 820, in addition to being BPSK modulated, may, for example, be quadrature phase shift keying (QPSK) modulated. QPSK modulation is another form of PSK and may incorporate four phases 840 on a constellation diagram equally spaced around a circle, as illustrated in constellation diagram 800C of FIG. 8C. Information encoded by QPSK modulation may also be based on the phase and the signal also has a low peak to average power ratio (PAPR).

Certain aspects of the present disclosure may provide that in addition to the information encoded in the phase of the L-Header 810 and EDMG header 820, the headers may incorporate a variety of signal amplitudes to allow an estimation of a PA's linearity by a transmitter or receiver. This estimation may be based on a comparison of the received and measured amplitude modulation against an expected amplitude modulation of a predefined pattern known at the receiver. In some cases, the receiver may obtain information regarding the predefined pattern (e.g., in the frame to which the amplitude modulation was applied or a previous frame). In some cases, the predefined pattern for amplitude modulation may be defined, for example, in a standard.

According to aspects of the present disclosure, the predefined amplitude modulation pattern may be incorporated without changing the phase modulation and this additional modulation pattern may have little to no impact on existing demodulation of the phase modulated portions of the header. For example, a wireless node capable of processing the amplitude modulation will find the amplitude modulation pattern decodable along with the existing phase modulated portions. Other wireless nodes which do not support processing amplitude modulation will still be able to decode the phase modulated portions. The transmitter or receiver may then compensate for the estimated non-linearity in order to improve the EVM at the receiver without any further information exchanges. Additional information exchanges between the transmitter and receiver, while not necessary, may also be provided (e.g., to identify a particular pattern used at the transmit-side for amplitude modulation).

The predefined pattern may include amplitudes that vary from a nominal amplitude value based on the average power. For example, the predefined pattern may include amplitudes that are lower or higher than the nominal amplitude value. The predefined pattern may also include smooth transitions relative to implementations without amplitude modulation, and may be designed to avoid influencing other parameters, such as out of band emission artifacts.

According to certain aspects of the present disclosure, an L-Header with two symbols or an EDMG-Header with one or two SC symbol (having 448 symbols) and a guard interval at each channel side may be amplitude modulated according to a predefined pattern. The amplitude "a" per SC symbol may be based on the following equation:

$$a(k) = \begin{cases} v_1 + k \cdot \frac{v_2 - v_1}{223} & k = 0 \ldots 223 \\ v_2 - (k - 224) \cdot \frac{v_2 - v_1}{223} & k = 24 \ldots 447 \end{cases}$$

In the above equation, k is the symbol index, $v_1$ is the start value (lowest), and $v_2$ is the middle value (highest). Examples of the $v_1$ and $v_2$ values are such that $v_1 = 0.5 \times m$ and $v_2 = 2 \times m$, where m is the mean voltage value (e.g. mean voltage level, usually 1.0), or the voltage average of the guard interval symbols.

According to other aspects of the present disclosure, an L-Header 810 with two symbols or an EDMG-Header 820 with one or two SC symbol (having 448 symbols) and a guard interval at each channel side may also be amplitude modulated based on the following equation:

$$a(k) = \begin{cases} \mathrm{sqrt}\left(v_1 + k \cdot \frac{v_2 - v_1}{223}\right) & k = 0 \ldots 223 \\ \mathrm{sqrt}\left(v_2 - (k - 224) \cdot \frac{v_2 - v_1}{223}\right) & k = 24 \ldots 447 \end{cases}$$

In this case, examples of the $v_1$ and $v_2$ values may be such that $v_1 = 0.25 \times m$ and $v_2 = 4 \times m$, where m is the mean power value (usually 1.0), or the power average of the guard interval symbols.

According to certain aspects of the present disclosure, where the EDMG-Header 820 consists of two or more SC symbols (having 512 symbols), for each of the two or more SC symbols, the same predetermined pattern may be applied for amplitude modulation for each symbol.

According to certain aspects of the present disclosure, amplitude modulation of headers may be utilized at a transmitter, a receiver, or both. For example, a wireless device acting as a transmitter may also be configured to operate the transmitter and receiver front-ends in parallel and the receiver front-end may be used to capture and measure the transmitted signal. In this case, the wireless device may compare the transmitted signal with the received signal and estimate the PA linearity through $v_{in}$ and $v_{out}$ transfer functions. Based on the comparison, the wireless device may monitor and adjust the transmitter to optimize output power and linearity. For example, the wireless device may tune the PA input power to adjust the transmitter pre-distortion, or perform long-term analysis of the PA. The adjusted transmit parameters may be applied to transmission of subsequently generated frames.

Figure 9:
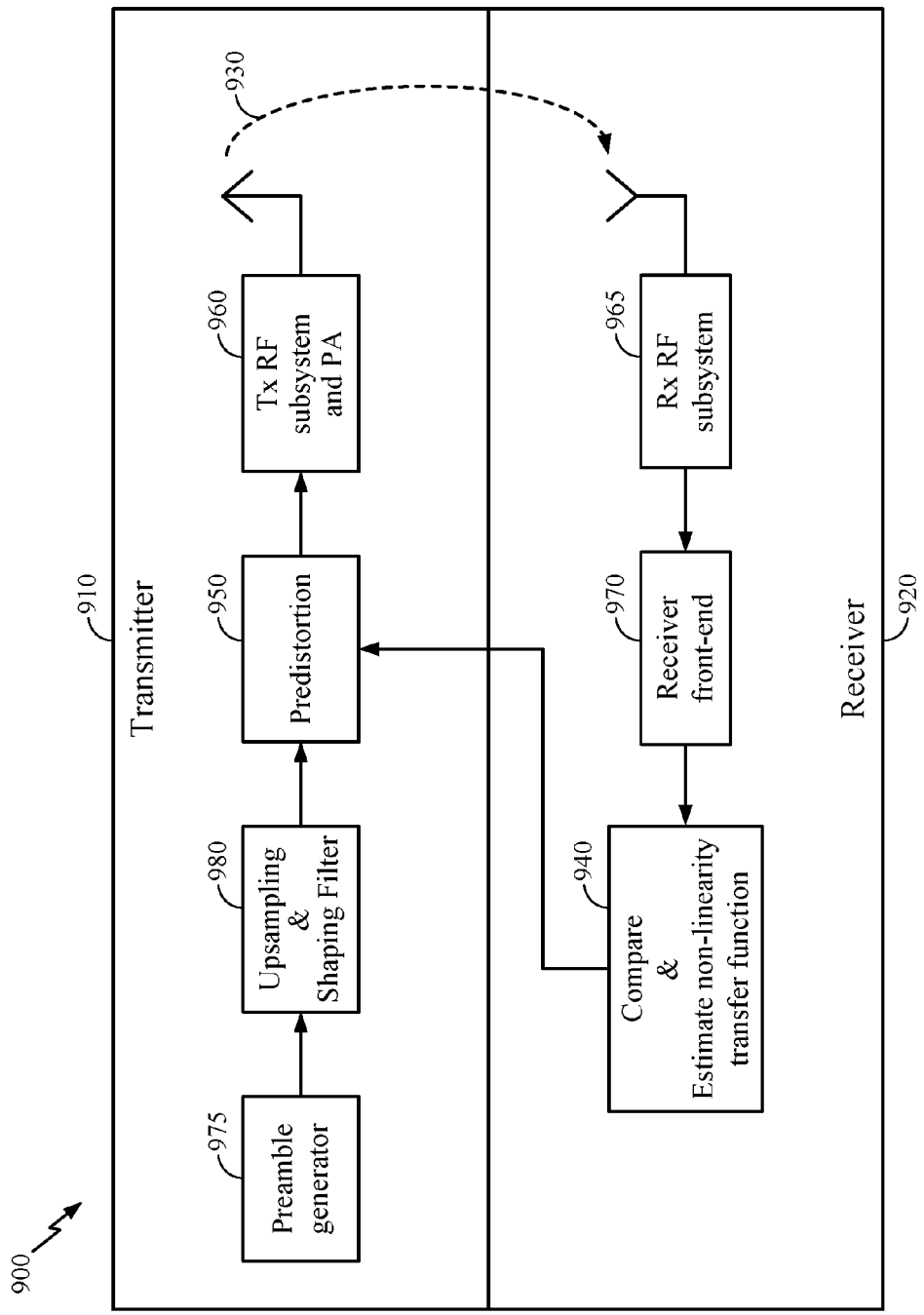
FIG. 9 is a block diagram of an example wireless transceiver, in accordance with certain aspects of the present disclosure.

FIG. 9 is a block diagram of an example wireless transceiver 900, in accordance with certain aspects of the present disclosure. According to certain aspects of the present disclosure, a transmitter may be configured to perform non-linearity estimation and adjust the transmitter's PA based on the estimation. As discussed above, a wireless device may be configured with a transmitter 910 and receiver 920 capable of transmitting and receiving at least some signals in parallel. The transmitter 910 and receiver 920 may include a radio frequency (RF) coupling 930 between the transmitter's output and the receiver's input. This RF coupling 930 may be via an over the air coupling, an RF coupling on the antenna or circuit board, or other coupling technique. This coupling may be across an entire antenna array, a part of an antenna array, or a single antenna, so long as the coupling does not distort the signal.

A preamble for a signal may be generated by a preamble generator block 975 and upsampled by the upsampling and shaping filter block 980. The PA portion of the Tx RF subsystem 960 may amplify the signal and this amplified signal may be distorted by the PA. The transmitter 910 may then transmit an amplitude modulated header using any known pre-distortion transmission setup while at least some portion of the receiver 920 is active. The receiver 920 may receive the transmission, via the Rx RF subsystem 965 and receiver front end 970, containing the amplitude modulated header. The signal is processed by the compare and estimate non-linearity transfer function block 940, which compares the transmitted signal with the received signal. The compare and estimate non-linearity transfer function block 940 may then generate updated parameters for a pre-distortion block 950. These updated parameters are passed to the pre-distortion block 950, which may update corresponding parameters. These updated parameters are then applied to the transmission, either prior to the data/payload of the packet, or in the next frame (e.g., one or more additional frames).

Figure 10:
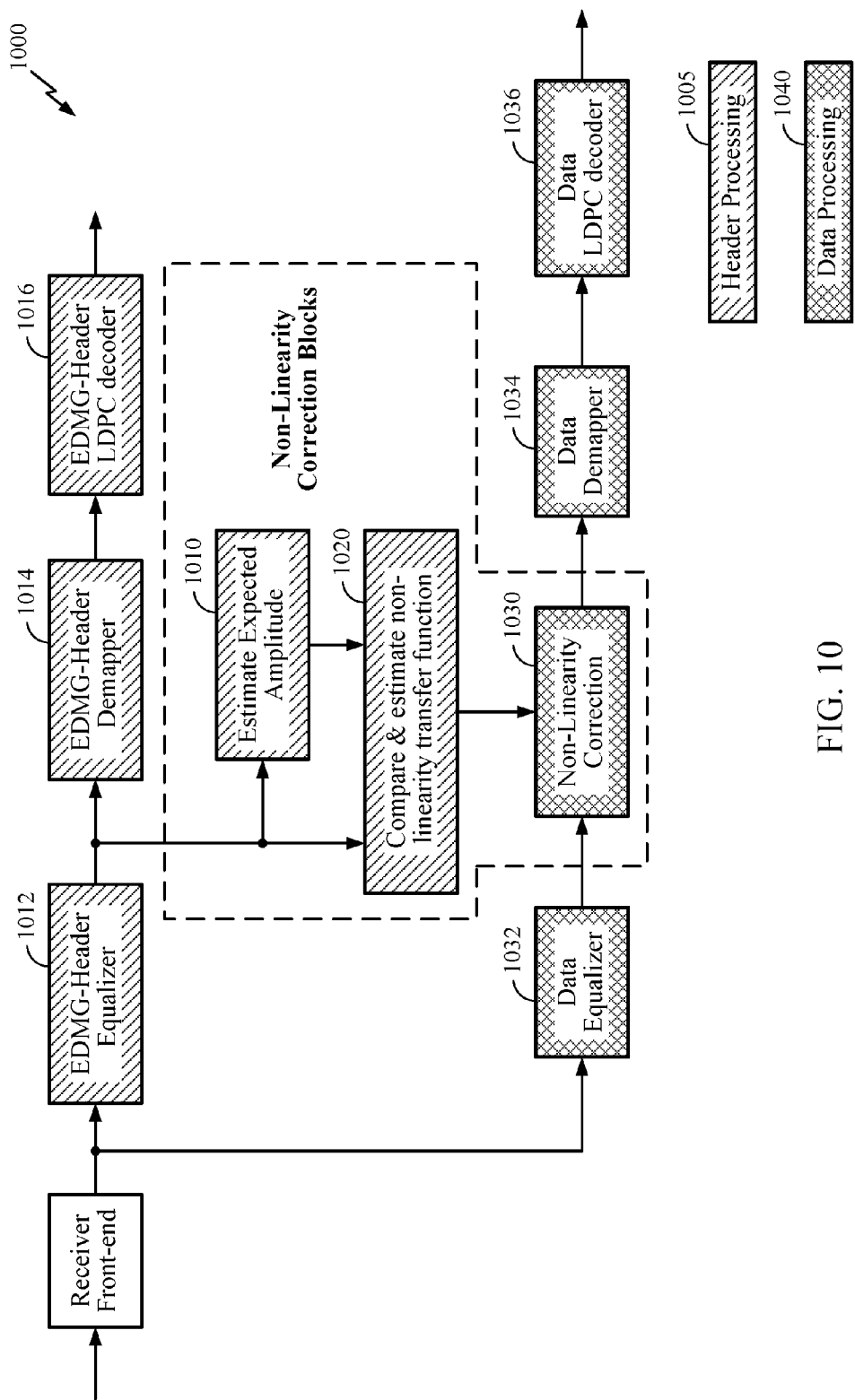
FIGS. 10-13 are block diagrams of example wireless receivers, in accordance with certain aspects of the present disclosure.

FIG. 10 is a block diagram of an example wireless receiver 1000, in accordance with certain aspects of the present disclosure. According to certain aspects of the present disclosure, a wireless receiver 1000 may include processing blocks for processing a header 1005, such as an EDMG header, separate from processing blocks for the data portions 1040 of the packet. After a received EDMG header is equalized at 1012, an estimate of the expected amplitude pattern for the header may be determined at block 1010. This estimate may be based on a predefined pattern. At block 1020, the estimated expected amplitude pattern is compared with the received amplitude pattern to determine a nonlinearity transfer function. This nonlinearity transfer function may be smoothed and then applied as a correction in a non-linearity correction block 1030 on the receiver, for example, during reception of the data portion after equalization at block 1032. The header may further be demapped at block 1014 and decoded at 1016. Similarly, the data portion may be demapped at block 1034 and decoded at 1036. Additionally, in accordance with certain aspects of the present disclosure, various processing blocks may be interchanged without departing from the scope of the claims. For example, blocks 1032 and 1030 may be swapped.

Figure 11:
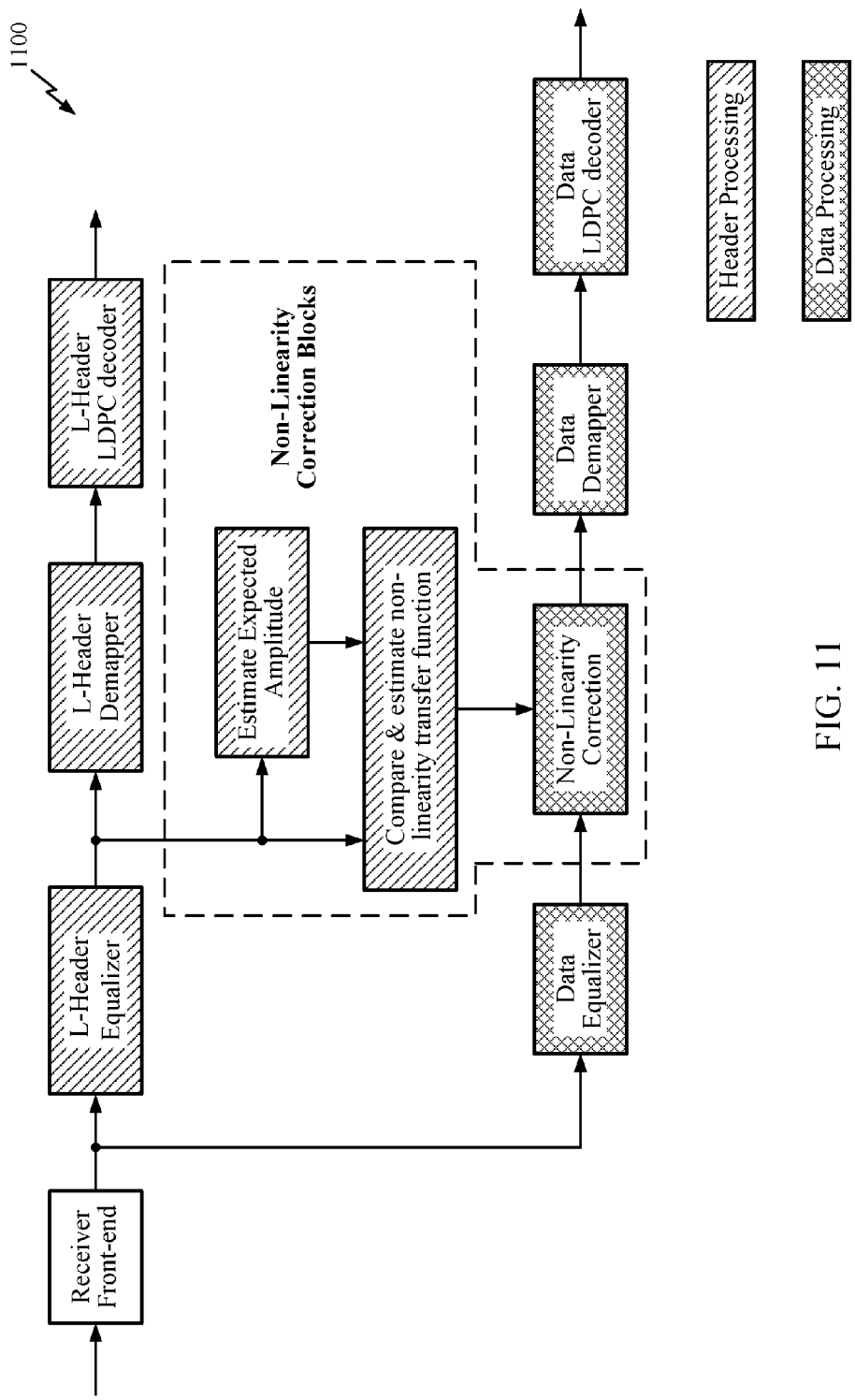

Other headers may be similarly processed as the EDMG header described above with reference to FIG. 10 to estimate non-linearities in a transmit power amplifier. For example, as shown in FIG. 11, an amplitude modulated L-header may be processed by wireless receiver 1100 in a similar manner instead of (or in addition to) an EDMG header.

Figure 12:
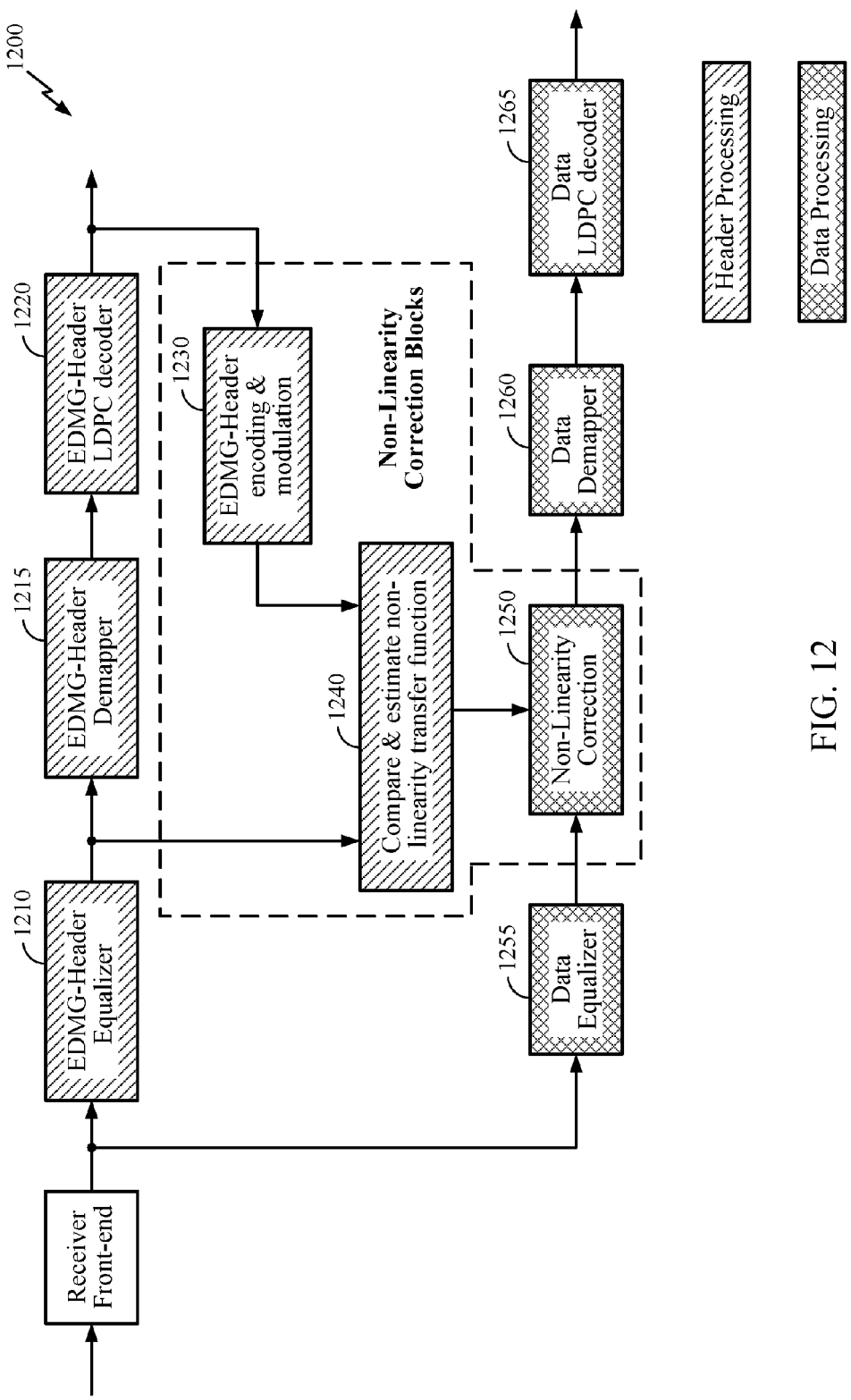

FIG. 12 is a block diagram of an example wireless receiver 1200, in accordance with certain aspects of the present disclosure. According to certain aspects of the present disclosure, a wireless receiver 1200 may include processing blocks for processing a header, such as an EDMG header, separate from processing blocks for the data portions of the packet. A received EDMG header may be received, equalized in the EDMG header equalizer block 1210, demapped in DMG header demapper block 1215, and decoded in the EDMG Header low density parity check (LDPC) decoder 1220 to a set of bits representing the EDMG header.

This set of bits may be re-encoded in the EDMG Header encoding and modulation block 1230. This re-encoding may utilize the same encoding and modulation used by a transmitter to transmit the header to produce a re-encoded amplitude pattern. This re-encoded amplitude pattern accurately represents the header as transmitted as the header was successfully decoded. The re-encoded amplitude pattern also represents the exact expected power for each sample of the pattern. At 1240, the re-encoded amplitude pattern is compared with the received amplitude pattern to determine a nonlinearity transfer function. This nonlinearity transfer function may be smoothed and then applied as a nonlinear correction 1250 on the receiver, for example, during reception of the data portion after data equalization at block 1255 and prior to data demapping at block 1260 and data decoding at 1265. Additionally, in accordance with certain aspects of the present disclosure, various processing blocks may be interchanged without departing from the scope of the claims. For example, blocks 1255 and 1250 may be swapped.

Figure 13:
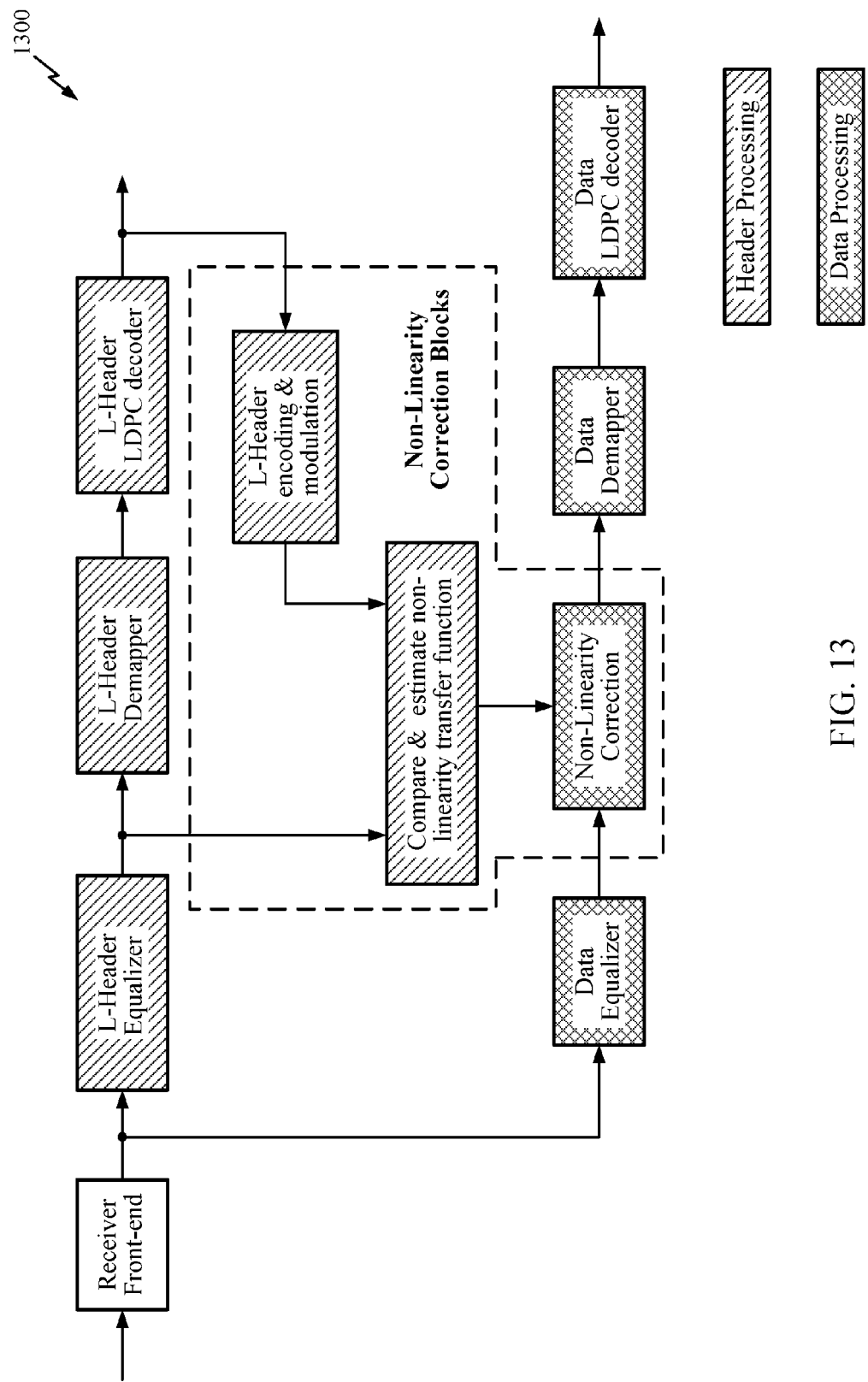

Other headers may be similarly processed as the EDMG header described above with reference to FIG. 12 to estimate non-linearities in a transmit power amplifier. For example, as shown in FIG. 13, an amplitude modulated L-header may be processed by wireless receiver 1300 in a similar manner instead of (or in addition to) an EDMG header.

Figure 6A:
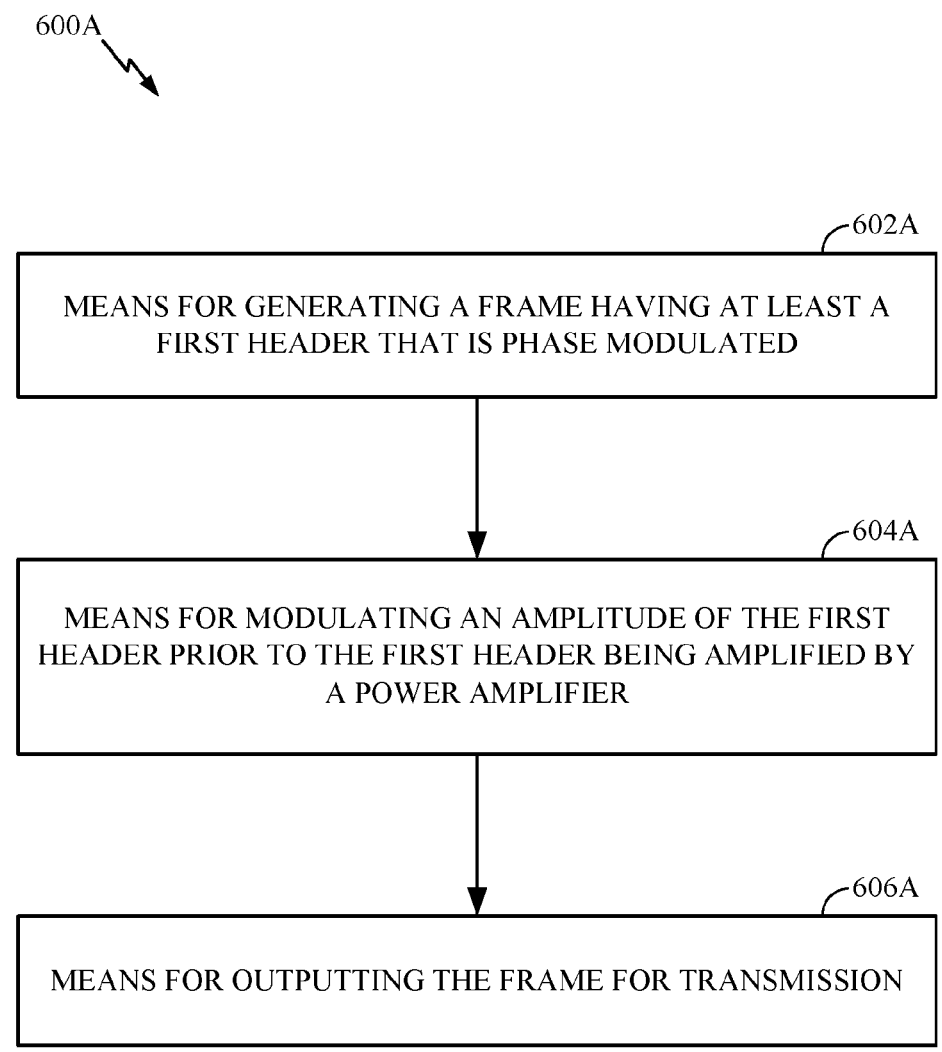
FIG. 6A illustrates example means capable of performing the operations shown in FIG. 6.
Figure 7A:
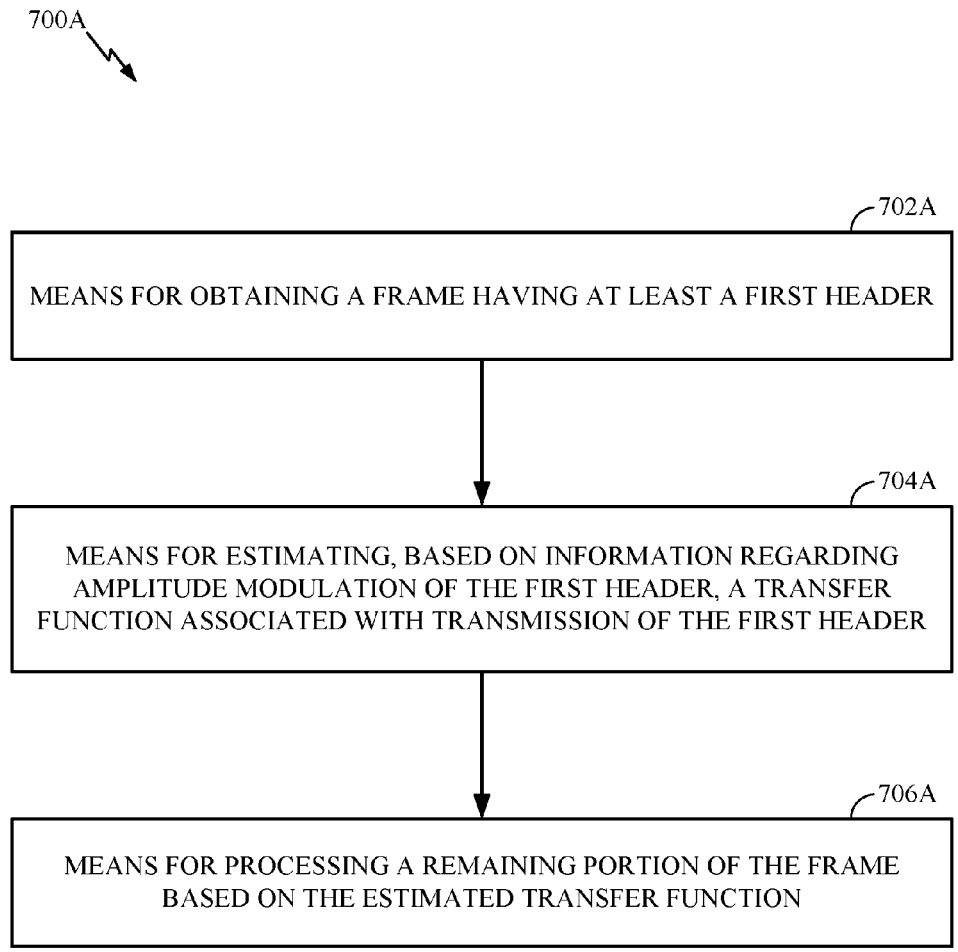
FIG. 7A illustrates example means capable of performing the operations shown in FIG. 7.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600 illustrated in FIG. 6 correspond to means 600A illustrated in FIG. 6A and operations 700 illustrated in FIG. 7 correspond to means 700A illustrated in FIG. 7A.

Means for obtaining (e.g., receiving) may comprise a receiver (e.g., the receiver unit 254) and/or an antenna(s) 252 of the UT 120 illustrated in FIG. 2 or the receiver 312 and/or antenna(s) 316 depicted in FIG. 3. Means for transmitting and means for outputting may be a transmitter (e.g., the transmitter unit of transceiver 254) and/or an antenna(s) 252 of the STA 120 illustrated in FIG. 2 or the transmitter (e.g., the transmitter unit of transceiver 222) and/or antenna(s) 224 of access point 110 illustrated in FIG. 2.

Means for generating, means for detecting, means for determining, means for obtaining, means for selecting, means for adjusting, means for processing, means for encoding, means for performing, means for modulating, means for estimating, means for processing, and/or means for applying may include a processing system, which may include one or more processors such as processors 260, 270, 288, and 290 and/or the controller 280 of the UT 120 or the processor 304 and/or the DSP 320 portrayed in FIG. 3.

In some cases, rather than actually transmitting a frame a device may have an interface to output a frame for transmission. For example, a processor may output a frame, via a bus interface, to a radio frequency (RF) front end for transmission. Similarly, rather than actually receiving a frame, a device may have an interface to obtain a frame received from another device. For example, a processor may obtain (or receive) a frame, via a bus interface, from an RF front end for reception.

According to certain aspects, such means may be implemented by processing systems configured to perform the corresponding functions by implementing various algorithms (e.g., in hardware or by executing software instructions) described above for determining rotation.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a STA 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a STA and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a STA and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to:
generate a frame having at least a first header that is phase modulated, wherein the first header comprises a first type of header decodable by first and second types of wireless nodes or a second type of header decodable by the second type of wireless nodes, but not the first type of wireless nodes; and
modulate an amplitude of the first header prior to the first header being amplified by a power amplifier; and
a first interface configured to output the frame for transmission.

2. The apparatus of claim 1, further comprising:
a second interface configured to obtain a signal via radio frequency coupling during transmission of at least the first header of the frame; and
wherein the processing system is further configured to:
estimate a transfer function of the power amplifier, based on the obtained signal; and adjust one or more transmit parameters based on the estimated transfer function.

3. The apparatus of claim 2, wherein the adjusted transmit parameters are used to transmit a remaining portion of the frame after transmission of the first header.

4. The apparatus of claim 2, wherein:
the processing system is configured to generate one or more additional frames; and
the first interface is configured to output the one or more additional frames for transmission using the adjusted transmit parameters.

5. The apparatus of claim 2, wherein the processing system is configured to determine expected amplitudes of the first header based on the obtained signal, and estimate the transfer function of the power amplifier further based on the determined expected amplitudes of the first header and measured amplitudes of the obtained signal.

6. The apparatus of claim 1, wherein the processing system is configured to modulate the amplitude based on a pattern.

7. The apparatus of claim 6, wherein:
the first header comprises at least two symbols; and
the processing system is further configured to modulate an amplitude of each of the at least two symbols based on the pattern.

8. The apparatus of claim 6, wherein the processing system is configured to modulate the amplitude of the first header and an amplitude of a second header of the frame based on the pattern.

9. The apparatus of claim 1, wherein:
the frame further comprises a second header that is phase modulated; and
the processing system is configured to modulate the amplitude of the first header based on a first pattern and modulate an amplitude of the second header based on a second pattern.

10. The apparatus of claim 1, further comprising:
a transmitter configured to transmit the frame, wherein the apparatus is configured as a wireless node.

11. An apparatus for wireless communications, comprising:
a processing system configured to:
generate a frame having at least a first header that is phase modulated; and
modulate an amplitude of the first header based on a pattern prior to the first header being amplified by a power amplifier, wherein the pattern comprises:
at least some portions of the first header at one or more voltage levels at or above a mean voltage level of the first header; and
at least some other portions of the first header at one or more voltage levels at or below the mean voltage level of the first header; and
an interface configured to output the frame for transmission.

12. The apparatus of claim 11, further comprising:
a transmitter configured to transmit the frame, wherein the apparatus is configured as a wireless node.

13. An apparatus for wireless communications, comprising:
an interface configured to obtain a frame having at least a first header; and
a processing system configured to:
estimate, based on information regarding amplitude modulation of the first header, a transfer function associated with transmission of the first header, wherein the information comprises information regarding a pattern used for the amplitude modulation; and
process a remaining portion of the frame based on the estimated transfer function.

14. The apparatus of claim 13, wherein the interface is configured to obtain the information prior to obtaining the frame having the first header.

15. The apparatus of claim 13, wherein the processing system is configured to:
estimate expected amplitudes of the first header based on the obtained frame;
measure amplitudes of the first header in the obtained frame; and
estimate the transfer function further based on a comparison of the estimated expected amplitudes of the first header to the measured amplitudes of the first header in the obtained frame.

16. The apparatus of claim 13, wherein:
the first header comprises at least two symbols;
the pattern was used for amplitude modulation of each of the at least two symbols; and
the processing system is configured to estimate the transfer function based on the at least two symbols and the information regarding the pattern.

17. The apparatus of claim 13, wherein:
the frame further comprises a second header; and
the information further comprises information regarding a first pattern used for the amplitude modulation of the first header and a second pattern used for amplitude modulation of the second header.

18. The apparatus of claim 13, further comprising:
a receiver configured to receive the frame, wherein the apparatus is configured as a wireless node.

19. An apparatus for wireless communication, comprising:
an interface configured to obtain a frame having at least a first header; and
a processing system configured to:
decode at least the first header of the obtained frame to obtain a set of bits;
encode the set of bits to obtain a re-encoded first header;
generate an amplitude pattern for the re-encoded first header;
compare the amplitude pattern generated for the re-encoded first header to an amplitude pattern for the first header of the obtained frame;
estimate, based on information regarding amplitude modulation of the first header and the comparison, a transfer function associated with transmission of the first header; and
process a remaining portion of the frame based on the estimated transfer function.

20. The apparatus of claim 19, further comprising:
a receiver configured to receive the frame, wherein the apparatus is configured as a wireless node.

21. An apparatus for wireless communication, comprising:
an interface configured to obtain a frame having at least a first header, wherein the first header comprises a first type of header decodable by first and second types of wireless nodes or a second type of header decodable by the second type of wireless nodes, but not the first type of wireless nodes, and wherein the apparatus is configured as a wireless node of the second type; and a processing system configured to:
  estimate, based on information regarding amplitude modulation of the first header, a transfer function associated with transmission of the first header; and
  process a remaining portion of the frame based on the estimated transfer function.

* * * * *